(12) United States Patent
Lange

(10) Patent No.: US 6,597,734 B1
(45) Date of Patent: Jul. 22, 2003

(54) PASSBAND TRANSVERSAL EQUALIZER

(75) Inventor: Julius Lange, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/421,688

(22) Filed: Oct. 20, 1999

(51) Int. Cl.[7] .............................................. H03H 7/30
(52) U.S. Cl. .................................................... 375/234
(58) Field of Search ................................ 375/234, 229, 375/235, 230, 232, 233; 708/319

(56) References Cited

U.S. PATENT DOCUMENTS

| | | | | |
|---|---|---|---|---|
| 5,396,517 A | * | 3/1995 | Yedid et al. ................. | 375/233 |
| 5,442,582 A | * | 8/1995 | Lange et al. ................ | 708/819 |
| 5,844,951 A | * | 12/1998 | Proakis et al. .............. | 375/347 |

* cited by examiner

*Primary Examiner*—Chi Pham
*Assistant Examiner*—Kevin M Burd
(74) *Attorney, Agent, or Firm*—Kenneth W. Float

(57) ABSTRACT

A passband transversal equalizer that uses a novel partitioning of circuits to improve the dynamic range and minimize unwanted signal interactions. The passband transversal equalizer uses a novel interconnection matrix and may be implemented using GaAs monolithic microwave integrated circuit (MMIC) devices for improved performance. The passband transversal equalizer comprises a divider that splits an input signal along a predetermined number of signal paths. Coaxial delay lines delay the signals propagating along the respective signal paths by a first set of nominal relative delays. A plurality of active divider having push-pull outputs are respectively coupled to the coaxial delay lines. An interconnection matrix respectively couples outputs of the active divider to one of a plurality of complex weighting and combiner circuits. A second plurality of coaxial delay lines delay the signals output by the complex weighting and combiner circuits by a second set of nominal relative delays. A combiner combines the signals to produce an equalized output.

11 Claims, 3 Drawing Sheets

PASSBAND TRANSVERSAL EQUALIZER

BACKGROUND

The present invention relates generally to transversal filters, and more particularly, to an improved passband transversal equalizer.

High rate digital communications systems, such as those that employ digital transmitters, are prone to distortion and intersymbol interference. Conventional baseband and passband transversal filter equalizers have been developed to minimize these problems. However, conventional transversal equalizers are relatively large and heavy and use a relatively large amount of power and exhibit distortion. Conventional transversal equalizers also exhibit relatively low dynamic range and have unwanted mutual interaction between signals.

It is an objective of the present invention to provide for an improved passband transversal equalizer that overcomes limitations found in conventional transversal equalizers.

SUMMARY OF THE INVENTION

To accomplish the above and other objectives, the present invention provides for an improved passband transversal equalizer that improves upon conventional transversal equalizers. The passband transversal equalizer uses a novel partitioning of circuits to improve the dynamic range and minimize unwanted signal interactions. The passband transversal equalizer uses a novel interconnection matrix and may be implemented using GaAs monolithic microwave integrated circuit (MMIC) devices for improved performance.

More particularly, the passband transversal equalizer comprises a divider that receives an input signal and splits the input signal along a predetermined number of signal paths. A first plurality of coaxial delay lines delays the signals propagating along the respective signal paths by a first set of nominal relative delays. A plurality of active divider having push-pull outputs is respectively coupled to outputs of each of the coaxial delay lines. An interconnection matrix couples one of the outputs of the active divider to one of a plurality of complex weighting and combiner circuits. A second plurality of coaxial delay lines, which delay the respective signals by a second set of nominal relative delays, are respectively coupled to the complex weighting and combiner circuits. A combiner combines the signals to produce an equalized output.

The passband transversal equalizer provides the following advantages. Transmission lines in the interconnection matrix exhibit low VSWR and minimal mutual interaction. The coaxial delay lines exhibit low VSWR and no mutual interaction. The equalizer has evenly distributed gain that increases its dynamic range and avoids problems with feedback and crosstalk. Using different delay lines easily customizes the tap delays.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
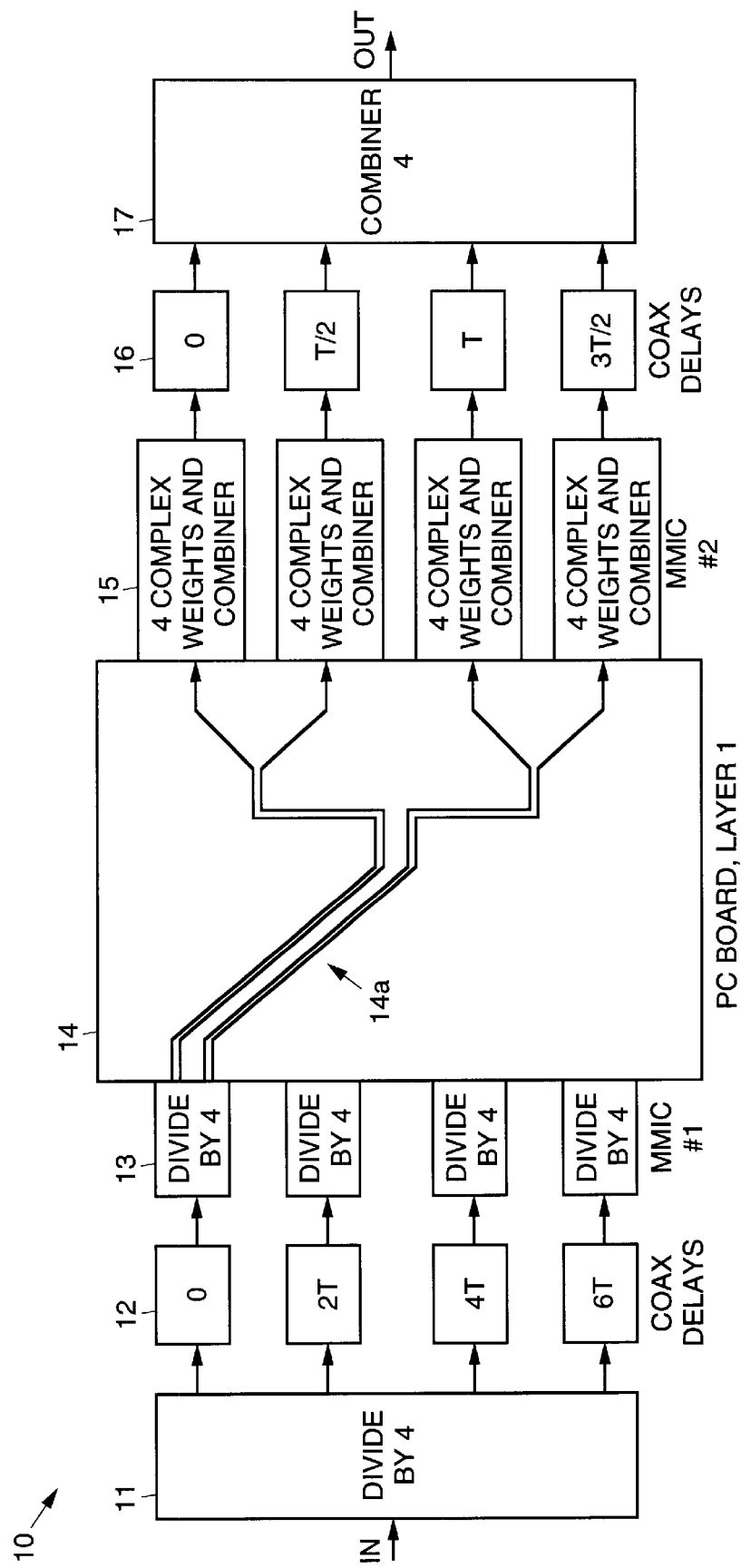
FIG. 1 illustrates a block diagram of an exemplary passband transversal equalizer in accordance with the principles of the present invention.

Referring to the drawing figures, FIG. 1 illustrates a block diagram of an exemplary passband transversal equalizer 10 in accordance with the principles of the present invention. The exemplary passband transversal equalizer 10 comprises a sixteen-tap T/2-spaced passband transversal equalizer 10.

The passband transversal equalizer 10 illustrated in FIG. 1 comprises a divider 11, which receives an input signal (IN) and splits the input signal along four signal paths. The four signals are respectively fed to coaxial delay lines 12 that delay the respective signals by a first set of nominal relative delays. In the exemplary embodiment, the first set of nominal relative delays are none, a relative delay of two (2T), a relative delay of four (4T), and a relative delay of six (6T). The divider 11 is preferably implemented as a passive commercially available standard divider 11.

Outputs of each of the coaxial delay lines 12 are input to an active four-way divider 13 having push-pull outputs. The active-four-way dividers 13 are preferably implemented as GaAs monolithic microwave integrated circuit (MMIC) devices 13.

Outputs of each of the active four-way dividers 13 are input to a respective interconnection matrix 14 (one shown) which may be implemented on a multi-layer PC board, for example. Each layer of the interconnection matrix 14 couples one of the outputs of the active four-way dividers 13 to a respective complex weighting and combiner circuit 15. Each complex weighting and combiner circuit 15, also called MMIC #2, is preferably implemented as a GaAs monolithic microwave integrated circuit (MMIC) device 15.

Outputs of the complex weighting and combiner circuits 15 are respectively coupled to a second plurality of coaxial delay lines 16. The second plurality of coaxial delay lines 16 delay the respective signals by a second set of nominal relative delays. In the exemplary embodiment, the second set of nominal relative delays are none, a relative delay of one-half (T/2), a relative delay of one (T), and a relative delay of three-halves (3T/2).

The second plurality of coaxial delay lines 16 is respectively coupled to a four-way combiner 17. The combiner 17 combines the signals coupled by way of each of the coaxial delay lines 16 to produce an equalized output. The four-way combiner 17 is preferably implemented as a passive commercially available standard divider 17.

Figure 3:
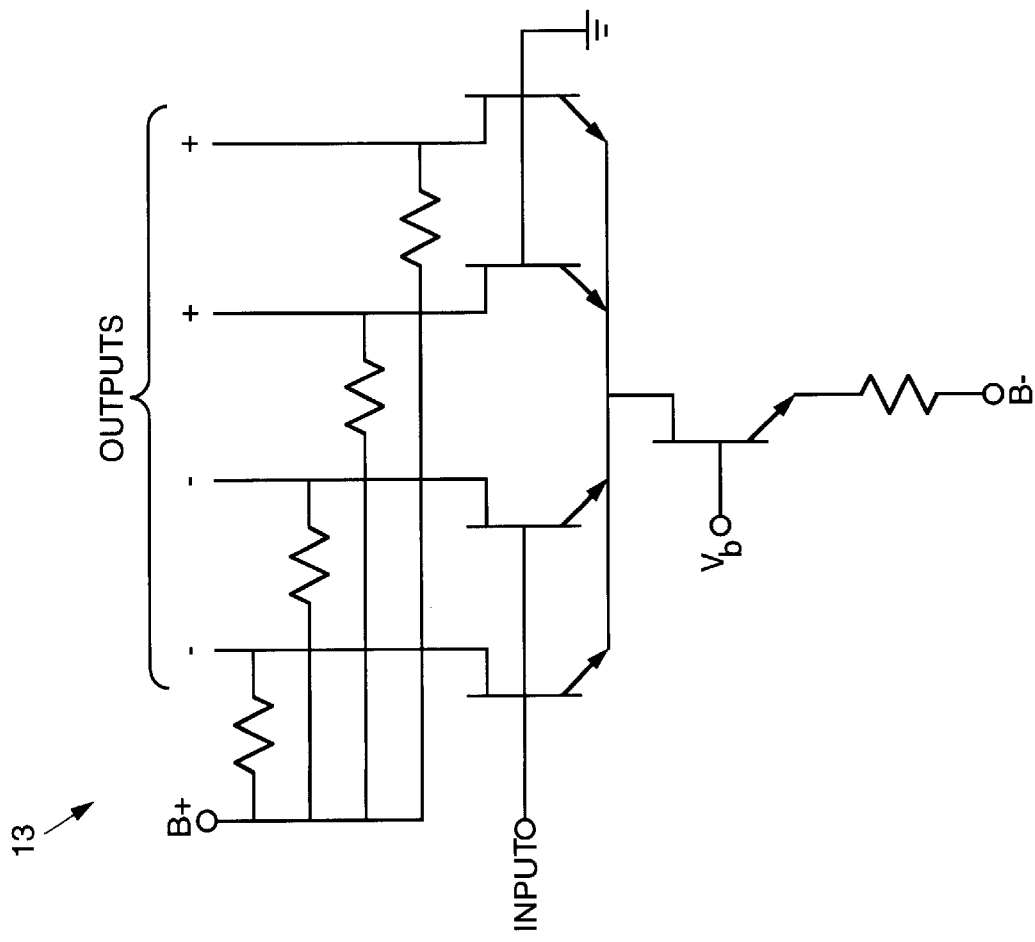

In operation, the incoming signal is split four ways by the divider 11. Each signal passes through one of the first coaxial delay lines 12 having the nominal relative delay shown in FIG. 1. Then, each signal is input to the MMIC #1 device 13, which comprises the active four-way divider 13 with push-pull outputs. Details of an exemplary active four-way divider 13 are shown in FIG. 3. This circuit should be easily understood by those skilled in the art and will not be described in detail. For the purposes of completeness, the signals B+, B− and $V_b$ are bias voltages and the outputs are indicated by the bracketed signal lines.

Figure 2:
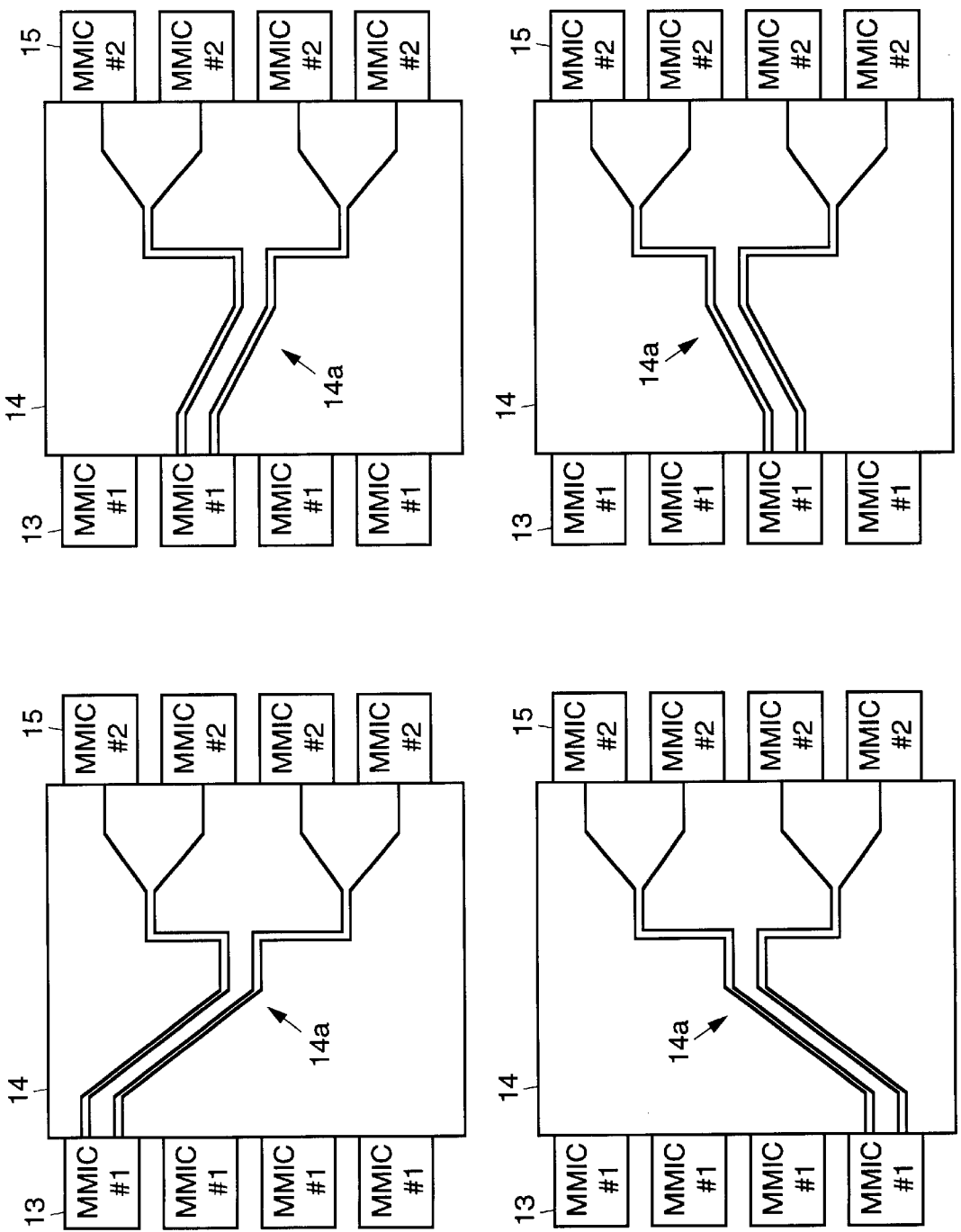
FIG. 2 illustrates an interconnection matrix implemented on a multi-layer PC board that may be employed in the passband transversal equalizer of FIG. 1.

Referring to FIG. 2, the interconnection matrix 14 comprises a multi-layer PC board 14 that has four signal layers, each of which carries only the signal from a specific MMIC

1 device 13. The four outputs of each MMIC #1 device 13 are coupled as two push-pull pairs for most of the length of the interconnection matrix 14. This arrangement provides a good transmission line environment and minimizes difficulties due to the presence of two ground planes. Then each of the four signals feeds a MMIC #2 device 15.

The interconnections between the MMIC #1 and MMIC #2 devices 13, 15 have an equal length for each layer, but this need not be true for interconnections on different layers, since adjustments may be made using the first set of coaxial delay lines 12. Solid metal ground planes (not shown) are interposed between the signal layers 14, shown in FIG. 2, to minimize interactions between the signals.

Figure 4:
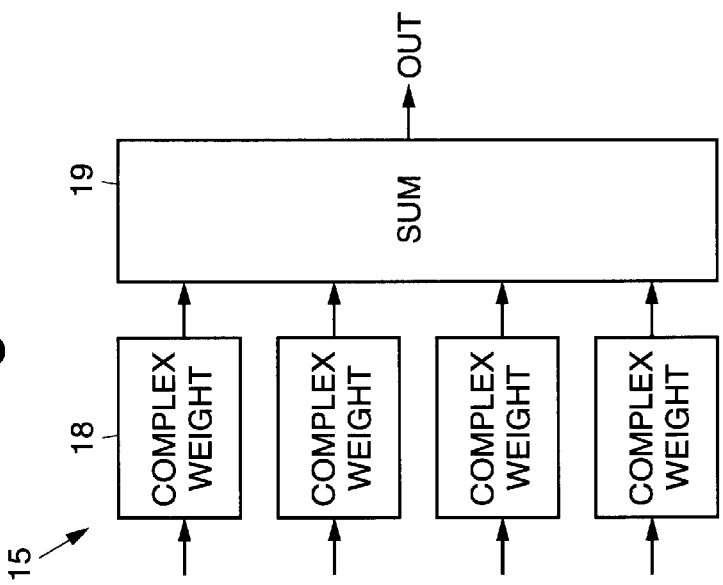
FIGS. 3 and 4 illustrate exemplary custom GaAs MMIC components that may be employed in the passband transversal equalizer of FIG. 1.

Referring to FIG. 4, each MMIC #2 device 15 contains four complex weights 18 and one active four-way combiner 19. Each complex weight 18 is fed from a different PC board layer 14. The four-way active combiner 19 follows the complex weights 15. The output from each MMIC #2 device 15 passes through a second coaxial delay line 16 having the nominal relative delay shown, see FIG. 1. The resulting signals from the four MMIC #2 devices 15 are then combined in the passive combiner 17 to produce the equalized output. Thus there are four MMIC #2 devices 15 for a total of 16 complex weights corresponding to sixteen taps.

Special care is taken to make sure that the gain is evenly distributed along each of the signal paths and high gain amplifiers are avoided. This keeps the signal level approximately the same along each signal path, avoiding problems with feedback and crosstalk. Feedback is especially troublesome in components with high gain and adjustable phase such as the MMIC #2 devices. Therefore just enough gain is provided in divider 13 to make up for its own losses, the losses in divider 11 and half the losses in the interconnection matrix 14. Likewise just enough gain is provided in the MMIC #2 device 15 to make up for its own losses, the losses in combiner 17 and the other half of the losses in the interconnection matrix 14.

The passband transversal equalizer 10 has the following advantages. Transmission lines 14a in the interconnection matrix 14 have low VSWR and minimal mutual interaction. The coaxial delay lines 12, 16 have low VSWR and no mutual interaction. The evenly distributed gain increases the dynamic range and avoids problems with feedback and crosstalk. Using different delay lines 12, 16 easily customizes the tap delays.

Thus, an improved passband transversal equalizer has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A passband transversal equalizer comprising:
    a divider that receives an input signal and splits the input signal along a predetermined number of signal paths;
    a first plurality of coaxial delay lines coupled to outputs of the divider that delay the signals propagating along the respective signal paths by a first set of nominal relative delays;
    a plurality of active dividers having push-pull outputs respectively coupled to outputs of each of the coaxial delay lines;
    an interconnection matrix coupled to each of the active dividers;
    a plurality of complex weighting and combiner circuit coupled to the interconnection matrix;
    a second plurality of coaxial delay lines respectively coupled to the complex weighting and combiner circuits that delay the respective signals by a second set of nominal relative delays; and
    a combiner coupled to the second plurality of coaxial delay lines that combines the signals therefrom to produce an equalized output.

2. The equalizer recited in claim 1 which comprises a sixteen tap T/2-spaced passband transversal equalizer.

3. The equalizer recited in claim 2 wherein the divider that receives an input signal splits the input signal along four signal paths.

4. The equalizer recited in claim 2 wherein the first set of nominal relative delays are none, a relative delay of two (2T), a relative delay of four (4T), and a relative delay of six (6T).

5. The equalizer recited in claim 1 wherein the active dividers are implemented as GaAs monolithic microwave integrated circuit (MMIC) devices.

6. The equalizer recited in claim 2 wherein the active dividers are implemented as GaAs monolithic microwave integrated circuit (MMIC) devices.

7. The equalizer recited in claim 1 wherein the interconnection matrix is implemented on a multi-layer PC board.

8. The equalizer recited in claim 1 wherein each complex weighting and combiner circuit is implemented as a GaAs monolithic microwave integrated circuit (MMIC) device.

9. The equalizer recited in claim 2 wherein the second set of nominal relative delays are none, a relative delay of one-half (T/2), a relative delay of one (T), and a relative delay of three-halves (3T/2).

10. The equalizer recited in claim 2 wherein the combiner coupled to the second plurality of coaxial delay lines comprises a four way combiner.

11. The equalizer recited in claim 2 wherein each complex weighting and combiner circuit is implemented as a GaAs monolithic microwave integrated circuit (MMIC) device.

* * * * *